US 12,492,871 B2

(12) United States Patent
Ellison

(10) Patent No.: US 12,492,871 B2
(45) Date of Patent: Dec. 9, 2025

(54) APPARATUS FOR THE ASSESSMENT OF THE PERFORMANCE OF A GROUND SOURCE HEAT EXCHANGER AND ASSOCIATED TEST METHODS

(71) Applicant: Ellison Environmental Services Ltd., Corwen (GB)

(72) Inventor: Geoff Ellison, Corwen (GB)

(73) Assignee: Ellison Environmental Services Ltd., Corwen (GB)

( * ) Notice: Subject to any disclaimer, the term of this patent is extended or adjusted under 35 U.S.C. 154(b) by 299 days.

(21) Appl. No.: 18/034,024

(22) PCT Filed: Oct. 15, 2021

(86) PCT No.: PCT/GB2021/052676
§ 371 (c)(1),
(2) Date: Apr. 26, 2023

(87) PCT Pub. No.: WO2022/090687
PCT Pub. Date: May 5, 2022

(65) Prior Publication Data
US 2023/0400268 A1 Dec. 14, 2023

(30) Foreign Application Priority Data

Oct. 28, 2020 (GB) .................................. 2017111

(51) Int. Cl.
*F28F 27/00* (2006.01)
*G01M 3/28* (2006.01)
*G01M 3/26* (2006.01)

(52) U.S. Cl.
CPC .......... *F28F 27/00* (2013.01); *F28F 2200/00* (2013.01); *G01M 3/26* (2013.01)

(58) Field of Classification Search
CPC ...... G01M 3/00; G01M 3/26–28; F28F 27/00; F28F 2200/00
See application file for complete search history.

(56) References Cited

U.S. PATENT DOCUMENTS

| 5,284,844 A * | 2/1994 | Lorenz .................. A01N 43/88 |
| | | 514/222.5 |
| 7,571,762 B2 * | 8/2009 | Ross ....................... F28F 27/02 |
| | | 165/45 |

(Continued)

FOREIGN PATENT DOCUMENTS

| GB | 2468211 A * | 9/2010 | ............. A01N 59/00 |
| KR | 20070000856 U * | 7/2007 | ............... F17D 3/01 |

(Continued)

OTHER PUBLICATIONS

KR-20070000856-U Machine Translation (Year: 2007).*

(Continued)

*Primary Examiner* — Nguyen Q. Ha
(74) *Attorney, Agent, or Firm* — Skaar Ulbrich Macari, P.A.

(57) ABSTRACT

A testing apparatus and an associated method for assessing the performance and integrity of a ground source heat exchanger installation are provided. The testing apparatus is configured to form a fluid tight, pressure resistant connection with the pipework of a ground source heat exchanger so as to create a test system. Fluid can then be pumped through the test system as the flow rate and/or fluid pressure are measured. By collecting this data about the fluid before and after it passes through the pipework the testing apparatus enables an operator to identify differences in the upstream and downstream values that may be indicative of a fault in the pipework. Preferably, fluid is circulated through the pipework in a first flow direction and then a second flow (Continued)

direction and measurements collected for both are compared to provide further detail of possible faults in the pipework.

16 Claims, 2 Drawing Sheets

(56) References Cited

U.S. PATENT DOCUMENTS

| | | |
|---|---|---|
| 2011/0220320 A1 | 9/2011 | Kidwell |
| 2012/0079880 A1 | 4/2012 | Freitag |
| 2017/0248333 A1 | 8/2017 | Varley et al. |
| 2019/0389030 A1* | 12/2019 | Maruyama .......... G01M 3/2807 |

FOREIGN PATENT DOCUMENTS

| | | | | |
|---|---|---|---|---|
| KR | 100837120 B1 * | 6/2008 | ............. | G01K 19/00 |
| KR | 20200090543 A | 7/2020 | | |
| WO | WO-2008009289 A1 * | 1/2008 | ......... | F28D 20/0052 |

OTHER PUBLICATIONS

KR-100837120-B1 Machine Translation (Year: 2008).*
International Search Report rendered by the International Bureau of WIPO for PCT/GB2021/052676, dated Dec. 23, 2021, 4 pages.
Written Opinion rendered by the International Bureau of WIPO for PCT/GB2021/052676, dated Dec. 23, 2021, 6 pages.

* cited by examiner

APPARATUS FOR THE ASSESSMENT OF THE PERFORMANCE OF A GROUND SOURCE HEAT EXCHANGER AND ASSOCIATED TEST METHODS

PRIORITY

This application claims the priority of Great Britain patent application GB 2017111.2, filed Oct. 28, 2020, which is hereby incorporated herein by reference in its entirety.

FIELD OF THE INVENTION

The present invention relates to ground source heat exchangers and in particular equipment and methods for use in testing the integrity of a ground source heat exchanger installations and in particular of the heat transfer loops (HTL) employed therein.

BACKGROUND OF THE INVENTION

The extraction of heat from the ground using a ground source heat pump (GSHP) to elevate the temperature sufficiently high, for use as heating and hot water, is an integral part of Government strategy for carbon neutrality by 2050. The use of heat pumps has applications for domestic, commercial, industrial and agricultural use.

Heat can be extracted from the ground using heat transfer loops (HTL). HTLs come in two main forms, namely horizontal collectors and vertical collectors. Each type of collector comprises a pipework (typically made from polyethylene) of sufficient length to ensure that there is adequate contact area between the pipework and surrounding ground to ensure that the heat pump can extract sufficient heat for the application.

The design of the heat collection system should ensure that the heat transfer is sustainable. It is known that, if the pipework is incorrectly sized and/or wrongly installed, the amount of heat extracted from the ground by a collector can outstrip the ground formation's ability to replenish the heat, which can cause the ground to freeze.

In order to avoid this, horizontal collectors typically comprise pipework that is arranged across a relatively large area at a relatively shallow depth (about a metre or so) below the surface of the ground.

In contrast, vertical collectors are deployed in boreholes that usually extend into the groundwater (e.g. typically by about 90-250 metres deep) and, as such, have a significantly reduced footprint. These vertical collectors of this type are less prone to freezing because groundwater flow helps to replenish the heat removed by the collector.

One of the main challenges of vertical collectors when compared to horizontal systems is that a large proportion of the HTL is buried deep underground, where it is largely inaccessible. This can make the process of checking the integrity of the HTL installation difficult. The polyethylene structure of the HTL is extremely durable and a correctly installed ground source heating borehole should operate successfully for many decades. Consequently it is imperative that the integrity of the HTL is confirmed after installation and prior to use.

SUMMARY OF THE INVENTION

With a view to checking the integrity of a ground source heat exchanger system the present invention provides a ground source heat exchanger testing apparatus.

The ground source heat exchanger testing apparatus according to certain embodiments includes: a first fluid conduit provided with a first flow meter and/or pressure monitor and a first heat exchanger engagement means; a second fluid conduit provided with a second flow meter and/or pressure monitor and a second heat exchanger engagement means; wherein the first and second heat exchanger engagement means are configured to form a fluid tight connection with pipework of a ground source heat exchanger that creates a flow path that runs through the first and second fluid conduits via the pipework; and a fluid pumping means, which is connectable to a fluid source, configured to create a flow of fluid within the flow path that runs through the first and second fluid conduits via the pipework.

It is envisaged that the pipework of the ground source heat exchanger could take the form of either a single heat transfer loop or a plurality of heat transfer loops connected in series. In situations where a plurality of heat transfer loops are connected in series, the engagement means of the testing apparatus could be connected at either end of the combined heat transfer loop structure.

Further, the heat transfer loop (s) could be in the form of a horizontal collector or a vertical collector.

By measuring the flow rate and/or pressure of the fluid before it enters the pipework of the ground source heat exchanger and after it leaves the pipework of the ground source heat exchanger, the testing apparatus enables an operator to identify any significant changes in the flow rate/fluid pressure that might be indicative of a blockage or restriction in the pipework or indeed another fault in the installation, such as a leak.

Preferably the apparatus may be configured to deliver a flow of fluid through the pipework of the ground source heat exchanger in either a first direction or a second direction, whereby the second direction is the reverse of the first direction.

It is envisioned that having the ability to reverse the flow of fluid through the pipework of the ground source heat exchanger enables the test apparatus to identify blockages or kinks in the pipework that might only impede the flow of fluid in one direction through the pipework.

Further preferably the fluid pumping means may be configured to be reversible such that fluid can be pumped through the pipework in either the first or the second direction.

Alternatively, the first and second fluid conduits may additionally be connected via a valve assembly that is configured to manage the direction of flow of the fluid entering/leaving the pipework of the ground source heat exchanger via the heat exchanger engagement means.

It is envisaged that employing a valve assembly can enable the direction of fluid flow through the pipework of the ground source heat exchanger to be reversed without the need to alter the direction of flow through the various other components in the test system (e.g. flow meters, pumping means, filters, viewing window, dump valve).

Preferably the apparatus may further comprise an integrated fluid source in the form of a storage tank, and wherein the storage tank is connected to at least one of the fluid conduits and the fluid pumping means.

It is envisioned that providing the testing apparatus with an on-board fluid reservoir enables the apparatus to be quickly deployed to ground source heat exchangers at different test sites, including sites without access to a mains water supply.

Further preferably, the storage tank may be connected to both the first and second fluid conduits so that, when the testing apparatus is in use, a complete loop is formed by the pipework of the ground source heat exchanger and the testing apparatus.

It is envisioned that, by connecting the first and second fluid conduits via the pipework of the ground source heat exchanger and the storage tank to form a complete loop, it is possible to recirculate a fluid from the storage tank, through the first fluid conduit into the pipework and back to the storage tank via the second fluid conduit. In this way the testing apparatus makes much more efficient use of the fluids, such as water for example, used in testing the pipework.

Preferably the apparatus may further comprise at least one fluid treatment system located on the first and/or second fluid conduit.

Further preferably the fluid treatment system may be a filtration unit. It is envisioned that a filtration unit may be provided to remove particulates from the test fluid thereby providing protection against blockages forming in the pipework of the ground source heat exchanger or in the flow meters/pressure monitors employed by the testing apparatus.

In this regard, further preferably filters may be provided on either side of the flow meters/pressure monitors to account for the reversal of fluid flow through the test system (e.g. reversible pumping means).

Preferably the apparatus may further comprise at least one sterilising means located on the first and/or second fluid conduit. Further preferably, the sterilising means may be selected from a group consisting of a biocide delivery module, an ultra-violet light source, a pasteurization module, or any combinations thereof.

It is envisioned that employing a sterilising means can reduce the likelihood of a bacterial colony growing within the pipework of the ground source heat exchanger, which might otherwise lead to the formation of a biofilm that could, over time, impact the fluid flow through the working ground source heating system.

Preferably the apparatus may further comprise at least one dump valve located on the first and/or second fluid conduit. It is envisioned that the dump valve can be operated to help purge unwanted air bubbles and particulates from the fluid flowing within the test system. Preferably the dump valve may be used to evacuate the system prior to the collection of fluid flow/pressure data from the flow meters/pressure monitors.

Preferably the apparatus may further comprise at least one viewing window provided in the first and/or second fluid conduit. Further preferably the viewing window is at least provided on the second fluid conduit, so that a visual inspection of fluid leaving the pipework can be carried out.

It is envisaged that, in embodiments in which fluid flows in both directions through the first and second fluid conduits, it is particularly useful to provide viewing windows on both the first and second conduits to enable visual inspection of the fluid when the flow through the system is reversed.

In cases where a dump valve is employed, it may also be beneficial to provide viewing windows on either side of the valve to provide a visual confirmation of any system purge.

In addition to the testing apparatus, the present invention also provides a method of testing the integrity of a heat transfer loop in a ground source heat exchanger.

The method of testing the integrity of pipework in a ground source heat exchanger according to certain embodiments includes: a) connecting a fluid source to the pipework of a ground source heat exchanger via fluid conduits to form a test system with a fluid flow path that passes through the pipework; b) pumping fluid around the fluid flow path of the test system; and c) measuring the fluid flow rate and/or fluid pressure both before and after the fluid enters the pipework and comparing the fluid flow rates and/or fluid pressure upstream and downstream of the pipework to identify any changes in the fluid flow rate/fluid pressure associated with the pipework.

By comparing the flow rate/pressure of the fluid leaving the pipework of a ground source heat exchanger with that of the fluid entering the pipework, an operator can identify possible issues with the ground source heater exchanger's integrity.

It is envisioned that measuring both the fluid flow rate and the fluid pressure enables an operator to identify faults with the pipework that, in time, could impair the efficient operation of the ground source heat exchanger system.

Preferably the method may further involve the step of reversing the direction of fluid flow through the pipework of the ground source heat exchanger and repeating the measurements (i.e. fluid flow rate/pressure) carried out on the fluid.

It is envisioned that testing fluid flow in both directions through the pipework increasing the prospects of identifying faults (e.g. blockages/restrictions) that might not otherwise be identified if the heat transfer loop(s) of the ground source heat exchanger was only tested in a single fluid flow direction.

Preferably the method may further involve the step of recording the results obtained in a print out or electronically. Creating a record of the results of the testing allows the installation of a specific heat transfer loop or series of connected heat transfer loops to help in the signing off as fit for purpose prior to the installation of other components of a ground source heat exchanger system (e.g. heat pump, connection conduits, manifolds, regulating equipment or anything else on the collector circuit).

Preferably the fluid source may be a storage tank and fluid pumped through the test system is recirculated via the storage tank.

It is envisioned that re-using a stored reservoir of test fluid helps to reduce the environmental impact of the test apparatus. In addition, it enables the method to be carried out in more locations where there may not be a convenient source of fluid (e.g. mains water).

Preferably the method may further involve the step of filtering the fluid to remove particulates that might otherwise accumulate within the test system. As noted above, filtering the test fluid can prevent the build-up of particulates that might otherwise damage the flow meters/pressure monitors, for example.

Preferably the method may further involve sterilizing the fluid to prevent the build-up of bacteria within the test system. Further preferably the fluid may be sterilized by: i) introducing a biocide into the fluid; ii) subjecting the fluid to UV light and/or heat to kill bacteria in the fluid; iii) a combination of both i) and ii).

As noted above, sterilising the fluid can reduce the likelihood of a bacterial colony growing within the pipework of the ground source heating borehole, which might otherwise lead to the formation of biofilms that could, over time, impact the fluid flow through the working ground source heating system.

BRIEF DESCRIPTION OF THE DRAWINGS

The present invention will now be described with reference to the preferred embodiments, wherein.

DETAILED DESCRIPTION OF THE PREFERRED EMBODIMENTS

The testing apparatus and associated method of the present invention will now be described with reference to two alternative embodiments.

Figure 1:
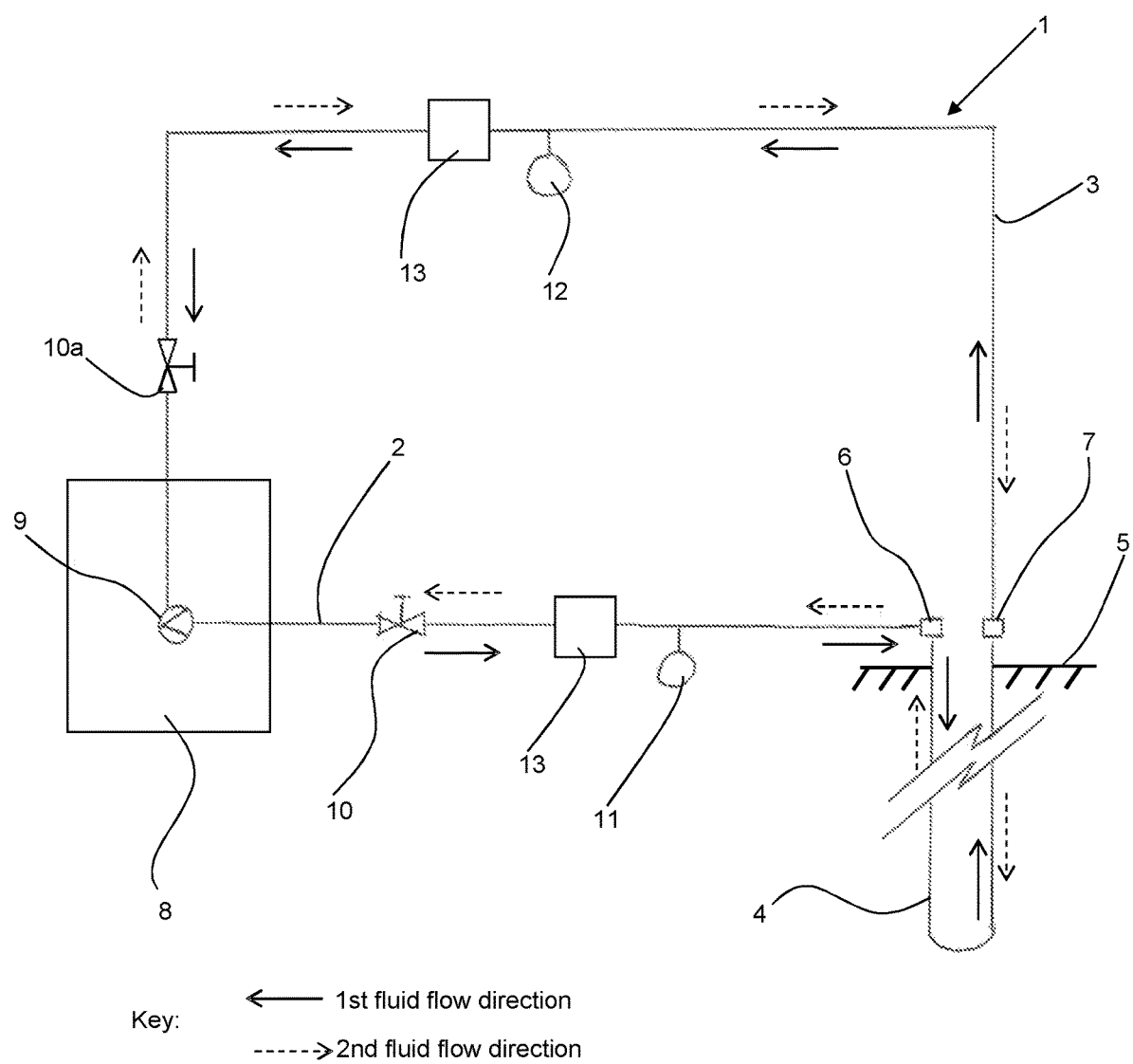
FIG. 1 shows a schematic diagram of test system formed from the vertical collector pipework of the ground source heat exchanger and a testing apparatus according to a first embodiment of the present invention.

FIG. 1 shows a first preferred embodiment of a test system 1 comprising a testing apparatus of the present invention connected to the pipework 4 of a ground source heat exchanger, which in this case is a single heat transfer loop buried within borehole that is formed under the surface of the ground 5.

It will be appreciated that although the depth of ground source heating borehole employed can vary from site to site, borehole depths of between 70-250 m are not uncommon. In view of this, and in order to extract heat from the ground, a pipework heat transfer loop of around 150-500 m is typically deployed within the borehole to facilitate the pumping of fluid into and out of the borehole. These values are provided as an example and should not necessarily be considered limiting on the present invention.

It will be appreciated that, for the ease of representation, the ground source heating borehole and the associated pipework 4 are shown in a truncated form in FIG. 1.

The testing apparatus of the first embodiment comprises a first fluid conduit 2 and a second fluid conduit 3. In use, the first fluid conduit 2 of the testing apparatus forms a fluid connection with one end of the pipework 4 by way of a first heat exchanger engagement means 6. In turn, the second fluid conduit 3 forms a fluid connection with the other end of the pipework loop 4 using a second heat exchanger engagement means 7.

It is envisioned that in heat exchangers that employ a series of heat transfer loops connected in series, the first and second engagement means would instead be connected at either end of the combined heat transfer loop structure. It will be appreciated that the following description would still apply, but possibly with a longer distance of pipework separating the first and second engagement means.

The skilled person will appreciate that the first and second heat exchanger engagement means 6, 7 can be provided in the form of any connection mechanism (e.g. threaded screw fit, compression fitting, electrofusion joint, clamps) that ensures a fluid tight connection that is robust enough to withstand the increased fluid pressures that are employed in the test method of the present invention.

As will be appreciated by the skilled person, the level of pressure applied to the test system will vary from one system to the next. Typically the pressures involved will increase with the length of the pipework employed in the ground source heat exchanger (e.g. single heat transfer loop or multiple heat transfer loops connected in parallel).

In the preferred embodiment shown in FIG. 1 the opposite ends of the first and second fluid conduits 2, 3 are connected to a fluid storage tank 8 with an associated pump 9, which also form part of the testing apparatus.

In use, when the testing apparatus is secured in fluid communication with the pipework 4 of the ground source heating borehole, the test system 1 with a continuous fluid flow path is created. Using the pump 9, fluid from the storage tank 8 can then be caused to circulate around the flow path of the test system 1.

In the embodiment shown in FIG. 1, the pump 9 is capable of creating a fluid flow that circulates throughout the entire test system in either a first direction (represented by solid arrows) or a second reversed direction (represented by dashed arrows) from the storage tank.

In the preferred test system 1 shown in FIG. 1, regulating valves 10, 10a are provided on the first and the second fluid conduits 2, 3 to allow variation of the flow rate of the fluid being pumped from the storage tank 8.

First and second flow meters 11 and 12 are provided on the first and second fluid conduits 2, 3 respectively such that they are located on either side of the pipework 4. In this way the test apparatus can measure the flow rate of the fluid both before and after it passes through the pipework 4. The data collected from the flow meters 11 and 12 can then be compared to identify any significant differences in the fluid flow rate caused by the pipework 4.

It is envisaged that at its most basic the readings from the two flow meters may simply be displayed on the test apparatus for an operator to inspect. However, in more sophisticated systems data from the flow meters may be automatically recorded for transfer of data to a computer or print out machine.

It is envisioned that when the pump 9 is operated to circulate fluid in the first direction (as represented by solid arrows), the flow meter 11 on the first fluid conduit 2 measures the upstream fluid flow rate (i.e. before the pipework 4) and the flow meter 12 on the second fluid conduit 3 measures the downstream fluid flow rate (i.e. after the pipework 4).

However, when the pump 9 is operated to circulate the fluid in the second, reversed direction (as represented by dashed arrows), the flow meter 12 on the second fluid conduit 3 measures the upstream fluid flow rate (i.e. before the pipework 4) and the flow meter 11 on the first fluid conduit 2 measures the downstream fluid flow rate (i.e. after the pipework 4).

It is appreciated that filters and/or treatment 13 may be provided to protect the flow meters 11, 12 from being damaged by materials (such as plastic swarf, biological material, or other particulates) within the test system.

Figure 2:
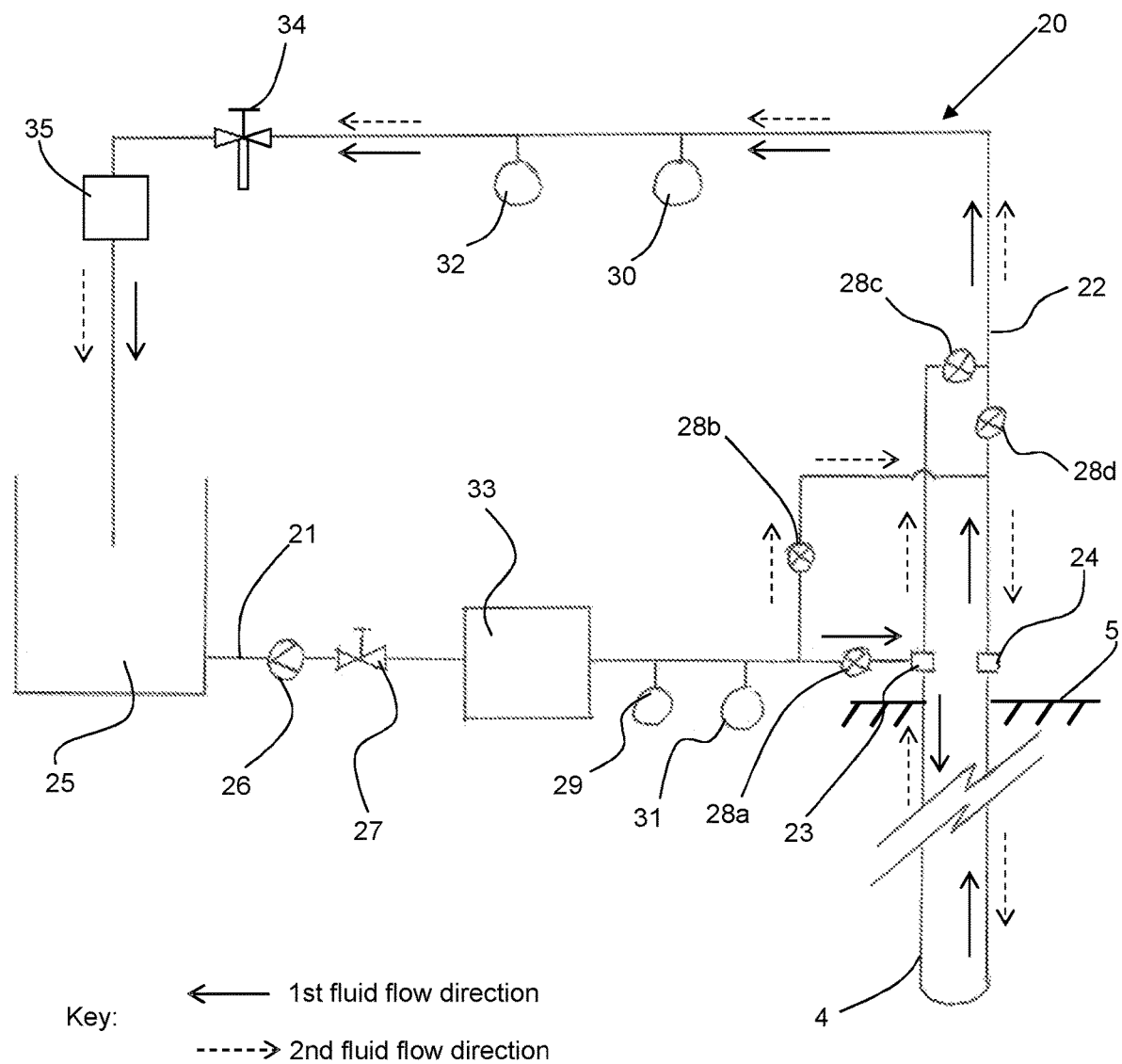
FIG. 2 shows a schematic diagram of test system formed from the vertical collector pipework of the ground source heat exchanger and a testing apparatus according to a second embodiment of the present invention.

FIG. 2 shows an alternative preferred embodiment of a test system 20 comprising another testing apparatus of the present invention connected to the pipework 4 of a ground source heating borehole that is formed under the surface of the ground 5.

Once again and as with FIG. 1, for the ease of representation, the ground source heating borehole and the heat transfer loop of the pipework 4 are shown in a truncated form in FIG. 2.

The testing apparatus of the second embodiment comprises a first fluid conduit 21 and a second fluid conduit 22. In use, the first fluid conduit 21 of the testing apparatus forms a fluid connection with one end of the pipework 4 by way of a first heat exchanger engagement means 23.

In turn, the second fluid conduit 22 forms a fluid connection with the other end of the pipework 4 using a second heat exchanger engagement means 24. As noted above with regard to the preferred embodiment shown in FIG. 1, the skilled person will appreciate that various connection mechanisms could suitably be employed to achieve the desired fluid tight, pressure resistant connection between the testing apparatus and the pipework 4 of the ground source heating borehole.

As with the testing apparatus shown in FIG. 1, the testing apparatus of the second embodiment is also provided with a fluid storage tank 25 that acts as the fluid source for the fluids used within the test system.

In contrast, however, the testing apparatus shown in FIG. 2 does not employ a two-way pump that is configured to circulate fluids from the storage tank in both directions around the entire test system. Instead the pump 26, which is located on the first fluid conduit 21 adjacent a regulating valve 27, is only operated to pump fluid from the storage tank in the first direction. As a result, the fluid flow through the majority of the first and second fluid conduits is in one direction only.

Rather than varying the direction of flow through the pipework 4 by reversing the direction of fluid flow throughout the entire system, the preferred embodiment shown in FIG. 2 employs a valve assembly that comprises four valves 28a, 28b, 28c, 28d. The valve assembly is operable to change the direction of flow by varying which of the heat exchanger engagement means 23, 24 is used to feed the fluid to the pipework 4.

By way of further explanation it will be appreciated from FIG. 2 that when the flow of fluid through the pipework 4 is to be in a first direction valves 28a and 28d are opened whilst valves 28b and 28c are closed. Then, when the flow of fluid through the pipework 4 is to be reversed (i.e. to flow in a second direction) valves 28b and 28c are opened whilst valves 28a and 28d are closed It will be appreciated that by simply operating the valves of the valve assembly fluid can be caused to flow in alternate directions through the pipework 4 whilst the direction of flow throughout the rest of the test system 20 remains the same.

As with the testing apparatus of the first embodiment of the present invention, the testing apparatus shown in FIG. 2 is also provided with a pair of flow meters 29, 30, with a first flow meter 29 provided upstream of the pipework 4 on the first fluid conduit 21 and a second flow meter 30 provided downstream of the pipework 4 on the second fluid conduit 22.

As detailed above, comparing the flow rate measurements of the fluid before and after it has passed through the pipework 4 can help to identify faults with the pipework, such as blockages/restrictions and/or leaks.

It is envisioned that the integrity of the pipework 4 can be further assessed by also monitoring the pressure of the fluid before and after it flows through the pipework 4 using pressure monitors 31 and 32.

As with the flow meters 29, 30, a first pressure monitor 31 is provided upstream of the pipework 4 on the first fluid conduit 21 and a second pressure monitor 32 is provided downstream of the pipework 4 on the second fluid conduit 22.

Further, as with the flow meters, at its most basic the readings from the two pressure monitors 31, 32 may simply be displayed on the test apparatus for an operator to inspect. However, in more sophisticated systems data will be recorded for transfer to a print-out machine or a computer where the data can be compared.

Although only pressure monitors are shown as being present in the testing assembly shown in FIG. 1, it is appreciated that a pair of suitable pressure monitors could also be added to the first and second fluid conduits respectively to enhance the sensitivity of the testing apparatus to faults in the pipework 4.

The testing apparatus shown in FIG. 2 is further provided with a treatment unit 33, which treats the fluid as it flows through the first fluid conduit 21 on its way to the pipework 4. It is envisaged that the treatment unit could apply a range of treatments to the fluid.

In particular, and as with the testing apparatus of the first embodiment, the treatment unit 33 comprises filtering means to help physically remove unwanted materials (e.g. particulates) from the fluid. In addition, the treatment unit may further comprise sanitizing means to remove/kill unwanted bacteria that may be present in the fluid.

In this regard, examples of suitable sanitizing means include: UV light treatment means, heat treatment means and biocide applicators. The skilled person will appreciate that other methods of sanitizing the fluid flowing through the test system may also be employed without departing from the general concept of the current invention.

Additionally, or alternatively, the testing apparatus of the present invention may comprise at least one dump valve on the first and/or second fluid conduit to allow air and particulates trapped in the fluid to be purged from the test system. The embodiment shown in FIG. 2 has a dump valve 34 provided after the flow meter and pressure monitor on the second fluid conduit.

The testing apparatus shown in FIG. 2 is also provided with a viewing window 35 downstream of the dump valve 34. The viewing window 35 allows for the visual inspection of the fluid flowing within the test system.

With reference to the test systems shown in FIGS. 1 and 2, the method of the present invention will now be described.

Once a ground source heat exchanger, such as a ground source heating borehole, and its associated pipework (i.e. heat transfer loop(s)) has been installed, the testing apparatus of the present invention can be connected to the two ends of heat exchanger's pipework.

Although it is generally envisaged that the testing apparatus would be connected to the pipework of a heat exchanger following its deployment within the ground, it is also appreciated that the test system of the present invention could also be used to test the pipework before it is installed within the ground. In this way the pre-installation characteristics and integrity of the pipework can be compared with those of the installed pipework to identify faults introduced by the installation process.

As noted above, the nature of the connection formed between the pipework and the testing assembly is such that pressurized fluid can be pumped through the test system without any loss of pressure from the testing apparatus.

Using the pump, fluid is then pumped via a flow path from the fluid storage tank through the pipework of the ground source heat exchanger and back to the storage tank. Sensors (e.g. flow meters/pressure monitors) are provided along the flow path of the test system to measure the characteristics of the fluid both before it reaches the pipework and after it leaves the pipework.

These measurements are then compared to see whether there is any significant difference between the upstream values and the downstream values. In the event that there are significant differences between the measured values this can indicate the presence of a fault (e.g. blockage/partial blockage, leak) in the pipework installation.

In preferred embodiments of the method of the present invention the direction of flow through the pipework is then reversed and a second set of measurements are collected from the new upstream and downstream locations.

As with the first set of collected values, the upstream and downstream values are compared with one another with a view to identifying significant differences between the measured values. However, in addition, the second set of values are also compared with the first set of collected values to identify significant differences that may indicate the presence of blockages/restrictions that are only effective in a single flow direction.

In situations where the pipework was tested prior to its installation, these results may also be compared with those collected from the installed ground source heat exchanger using the testing apparatus of the present invention.

The invention claimed is:

1. A ground source heat exchanger heat transfer loop testing apparatus comprising:
   a first fluid conduit provided with a first flow meter and/or pressure monitor and a first heat exchanger engagement means;
   a second fluid conduit provided with a second flow meter and/or pressure monitor and a second heat exchanger engagement means;
   wherein the first and second heat exchanger engagement means are configured to form a fluid tight connection with pipework of a ground source heat exchanger that creates a flow path that runs through the first and second fluid conduits via the pipework, said pipework taking the form of either a single heat transfer loop or a plurality of heat transfer loops connected in series; and
   a fluid pumping means, which is connectable to a fluid source, configured to create a flow of fluid within the flow path that runs through the first and second fluid conduits via the pipework in either a first or a second direction, whereby the second direction is the reverse of the first direction;
   wherein the fluid source is an integrated storage tank that is connected to both the first and second fluid conduits so that, in use, a complete loop is formed by the pipework of the ground source heater exchanger and the apparatus; and
   wherein the first and second flow meters and/or pressure monitors are configured to measure the flow rate and/or pressure of the fluid before it enters the pipework of the ground source heat exchanger and after it leaves the pipework of the ground source heat exchanger.

2. The testing apparatus of claim 1, wherein the fluid pumping means are configured to be reversible such that fluid can be pumped through the pipework in either the first or the second direction.

3. The testing apparatus of claim 1, wherein the first and second fluid conduits are additionally connected via a valve assembly that is configured to manage the direction of flow of the fluid entering/leaving the pipework of a ground source heat exchanger via said heat exchanger engagement means.

4. The testing apparatus of claim 1, further comprising at least one filtration means located on the first and/or second fluid conduit.

5. The testing apparatus of claim 1, further comprising at least one sterilising means located on the first and/or second fluid conduit.

6. The testing apparatus of claim 5, wherein the sterilising means is selected from a group consisting of a biocide delivery module, an ultra-violet light source, a pasteurization module, or any combination thereof.

7. The testing apparatus of claim 1, further comprising at least one dump valve located on the first and/or second fluid conduit.

8. The testing apparatus of claim 1, further comprising at least one viewing window provided in the first and/or second fluid conduit.

9. A method of testing the integrity of pipework in a ground source heat exchanger, said pipework taking the form of a heat transfer loop or a plurality of heat transfer loops connected in series, said method comprising:
   a) connecting a fluid storage tank to the pipework of a ground source heat exchanger via fluid conduits to form a test system with a fluid flow path that passes through the pipework;
   b) pumping fluid around the fluid flow path of the test system such that fluid is recirculated via the storage tank; and
   c) measuring the fluid flow rate and/or fluid pressure both before and after the fluid enters the pipework and comparing the fluid flow rates and/or fluid pressure upstream and downstream of the pipework to identify any changes in the fluid flow rate/fluid pressure associated with the pipework.

10. The method of claim 9, further comprising the step of reversing the direction of fluid flow through the pipework of the ground source heat exchanger and repeating the measurements carried out on the fluid.

11. The method of claim 9, further comprising the step of filtering the fluid to remove particulates that might otherwise accumulate within the test system.

12. The method of claim 9, further comprising sterilizing the fluid to prevent the build-up of bacteria within the test system.

13. The method of claim 12, wherein the fluid is sterilized by:
   i) introducing a biocide into the fluid;
   ii) subjecting the fluid to UV light and/or heat to kill bacteria in the fluid; or
   iii) a combination of both i) and ii).

14. The method of claim 9, further comprising the method step of providing a viewing window at a point in the flow path downstream of the pipework and visually monitoring the fluid as it flows passed the viewing window.

15. The method of claim 9, further comprising operating at least one dump valve to evacuate air and/or particulates within the fluid from the test system prior to carrying out step c).

16. The method of claim 9, wherein the integrity of the pipework is tested both before and after it is installed in the ground and then the measurement collected in step c) are compared to identify faults that may have been formed during the installation of the pipework.

* * * * *